United States Patent [19]

Kornbaum et al.

[11] 4,412,897

[45] Nov. 1, 1983

[54] PROCESS FOR RENDERING POLYMERS RESISTANT TO IONIZING RADIATION, AND COMPOSITIONS OBTAINED THEREBY

[75] Inventors: Simon Kornbaum, Caluire; Jean-Yves Chénard, Pau, both of France

[73] Assignee: Ato Chimie, France

[21] Appl. No.: 310,121

[22] Filed: Oct. 9, 1981

[30] Foreign Application Priority Data

Oct. 13, 1980 [FR] France ................. 80 21816

[51] Int. Cl.$^3$ .................... C08F 8/00; C08F 8/06
[52] U.S. Cl. .................... 204/159.2; 524/177; 524/180; 524/302; 524/347
[58] Field of Search ........... 523/137, 300; 524/302, 524/347, 180, 177; 204/159.2

[56] References Cited

U.S. PATENT DOCUMENTS

| | | | |
|---|---|---|---|
| 2,604,458 | 7/1952 | Havens | 524/346 |
| 2,662,867 | 12/1953 | Hoertz | 524/345 |
| 3,067,166 | 12/1962 | Zaremsky | 524/302 |
| 3,507,827 | 4/1970 | Pollock | 524/302 |
| 4,029,618 | 6/1977 | Dieckmann | 524/345 |
| 4,039,723 | 8/1977 | Moyer | 524/302 |
| 4,094,757 | 6/1978 | Zapp et al. | 204/159.2 |
| 4,360,619 | 11/1982 | Kugele et al. | 524/180 |

FOREIGN PATENT DOCUMENTS

| | | |
|---|---|---|
| 50070 | 4/1982 | European Pat. Off. . |
| 2434835 | 3/1980 | France . |

OTHER PUBLICATIONS

CA 61 3263h (1964).

*Primary Examiner*—V. P. Hoke
*Attorney, Agent, or Firm*—Ostrolenk, Faber, Gerb & Soffen

[57] ABSTRACT

The process concerns stabilization of polymers against ionizing radiation where the polymer molecule contains a halogen. It comprises incorporating hydroquinone into the polymer, especially into polyvinyl chloride, the polymer containing both a metallic compound, heat stabilizer, and also a mercaptan.

16 Claims, No Drawings

PROCESS FOR RENDERING POLYMERS RESISTANT TO IONIZING RADIATION, AND COMPOSITIONS OBTAINED THEREBY

This invention relates to a process which enables various polymers in which the macromolecule contains halogen to be made resistant to ionizing radiation. The invention also includes the polymers which are thus stabilized, and compositions which contain such stabilized polymers.

In the applications of plastics materials where they are to be subjected to the action of ionizing rays, especially X-rays, gamma rays, beta rays or others, there is a danger that as a result of this action there will be alterations, which may be more or less conspicuous, in the material. Those resins which are referred to as halogenated, especially halogeno-vinylic or vinylidenic, are vulnerable under these conditions. They suffer badly from these radiations, and the radiation action manifests itself as an abnormal coloration of the resin. This is a disadvantage which is all the more regrettable because halogeno-vinylic polymers, and especially polyvinyl chloride, are of considerable technological and economic importance.

Up until now, it has seemed that only certain plasticizers would enable one to achieve an improved behavior of polyvinyl chloride with respect to gamma rays. Thus, it has been stated, in Chemical Abstracts Vol. 61 (1964), 3263, in the publication by Tadashi Kimura (Osaka Munic. Tech. Res. Inst. Japan), that of those plasticizers of the phosphate type, bis(2-ethyl hexyl) sebacate or bis(2-ethyl hexyl) phthalate would give favorable results from this point of view. However, in practice, one is frequently looking to subject to ionizing radiation a resin which does not have to contain a plasticizer. One important case is that of the sterilization of products or foodstuffs contained in bottles or other packages of polyvinyl chloride. For one thing, good mechanical behavior of the package demands a sufficient rigidity, thus absence of plasticizer; additionally there is a risk of the plasticizer contaminating the packaged product, which expresses itself in particular as a health hazard for food, cosmetic, hygienic or pharmaceutical products.

The present invention enables one to subject resins containing halogen to ionizing radiation, at doses of sufficient magnitude for sterilization, without the resin undergoing an alteration, and achieving this both in the presence of and in the absence of plasticizers. In particular, thanks to the present invention, it becomes possible to sterilize various products, packaged in containers of polyvinyl chloride without plasticizer, at doses of gamma radiation up to about 3 megarads, without any damage to the polymer of the container. The polymer thus remains colorless or slightly yellowish, in other words it retains substantially its original color.

The novel process according to the present invention comprises incorporating into the polymer, all together, a stabilizer based on a metallic compound, a thiol and hydroquinone. It is surprising that the association of these three adjuvants renders the resin resistant to ionizing radiation, especially as such a result has not been able to be obtained with the standard additives, metallic compounds, thiols and—occasionally—anti-oxygens, largely used until now for heat and light stabilization of halogenated resins. A process is known for example, according to British patent specification No. 1001344, for the heat and light stabilization of homopolymers and copolymers containing chlorine, in which there is added to the resin an organic compound of a metal, notably Mg, Ca, Zn, Cd, Ba, Al, Zn, Sn, etc., an organic compound containing sulfur, and a phenolic, amino or other anti-oxygen. The phenolic anti-oxygens always carry substitutes which create a strong steric barrier around each of the phenol functions which are present; this is in any case a rule which is well known in the art, that the anti-oxidant action cannot exert itself to good effect except with —OH protected by substitutes on the neighboring carbon, and moreover preferably branched substitutes. A typical example is that of 2,6-di-tert-butyl 4-methyl phenol, which is often used in various situations. As against this there has never been any suggestion of associating with the standard stabilizers a diphenol such as hydroquinone where the two —OH are sterically entirely free, hence contrary to present acknowledged ideas.

Consequently, the novel process according to the invention has an unexpected aspect in that it leads to stabilization against ionizing rays, thanks to the presence of hydroquinone jointly with standard stabilizers, which protect only against the effects of heat but not against the effects of high energy radiation.

The metallic compound which forms one of the three synergic adjuvants, according to the invention, can be any metallic stabilizer, known per se, for example an organic derivative of one or more metals, especially those such as Ca, Ba, Zn, Pb, Zn, Sb, etc. The stannic and antimonious heat stabilizers which are very widely used at the present time, because of their efficiency, are very strongly recommended for a preferred embodiment of the invention. Thus, one can use the compounds of the type:

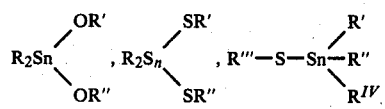

and similar substances in which the symbols R, R', R", R''' and $R^{IV}$ designate different organic groups, and even inorganic groups. The following compounds are notable examples:

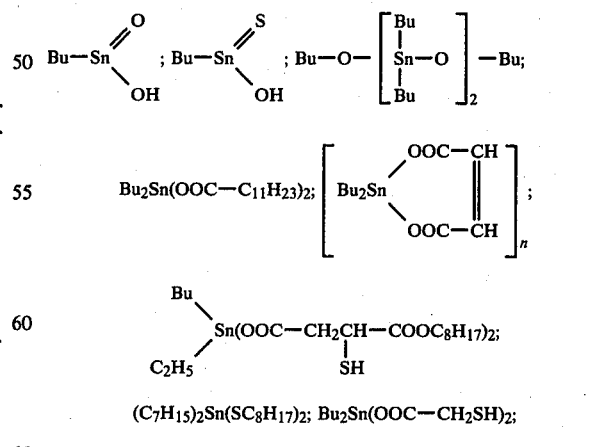

wherein "Bu" represents the butyl radical and "n" the degree of polymerization.

The stannic compounds can be replaced or accompanied by the equivalent combinations of antimony.

The proportion of the organo-metallic stabilizer can be the same as that used in the known technique for the heat stabilization of the material, that is to say in general from 0.01 to 5% by weight of the resin, and more frequently of the order of 0.5 to 2.5%. Moreover, one practical method of putting the invention into practice consists of furnishing a resin ready to be used, containing all the beneficial additives, including the stabilizers against heat, kneading it with heat, to a semi-pasty state, to incorporate into it hydroquinone, and then shaping the resin into the desired form. Thus, one can use for example the compositions described in French patent publication No. 2 434 835, and U.S. Pat. Nos. 3,063,963; 3,507,827; 3,970,689 and 2,914,506. These compositions undergo a distinct alteration as soon as the dose of radiation exceeds 0.5 megarad, although they will withstand 1 megarad and more when they incorporate hydroquinone.

From what has been stated above, it will be apparent that all sorts of thiols can be used within the scope of the invention. However, it is preferred to use esters carrying a mercaptan function in their acid residue or in the alcohol residue. These substances can be represented in a general way by the following formulae:

$$R-\underset{SH}{CH}-(CH_2)_n-COOR' \qquad (1)$$

$$R(CH_2)_m-COOR''SH \qquad (2)$$

where R is a hydrocarbon group of $C_1$ to $C_{20}$ or else hydrogen, R' is an alkyl or alkenyl of $C_1$ to $C_{18}$, m and n are 0 or whole numbers from 1 to 6, R" being an alkylene or alkenylene of $C_1$ to $C_{18}$.

It is advantageous to use esters of formula (2) in which $R(CH_2)_m-$ is an aliphatic chain of $C_6$ to $C_{18}$, in particular one derived from an oily substance, while R" is a lower alkyl or alkenyl of $C_1$ to $C_4$.

Preferably, the mercaptan ester is chosen from those in which the molecule contains 1 —SH group for 3 to 10 carbon atoms, that is to say from among those which, as described in the prior French patent application No. 8021662 of Societe anonyme Ato Chimie ("Improvements in the sterilization of objects made of halogenovinylic polymers using ionizing radiation, and resins for achieving this"), now European Pat. No. 0050070, published Apr. 21, 1982, themselves bring about an improvement in the resistance to ionizing radiation when they are used jointly with standard heat stabilizers. More especially, in one method of carrying out the invention, which is particularly interesting, the mercaptan ester incorporated into the resin is derived from a carboxylic diacid or from a polyol and bears two —SH groups, respectively at opposite ends of the molecule. These preferred mercaptan esters can be represented by the general formula:

$$HS-(CH_2)_n-Z-(CH_2)_m-Z-(CH_2)_n-SH \qquad (3)$$

where Z represents the carboxy group $$-\underset{O}{\overset{\|}{C}}-O-$$

in which the carbon atom is connected to a carbon atom of the chain $(CH_2)_n$ or of the chain $(CH_2)_m$. The whole number n can vary from 1 to 9 and m from 1 to 18, but on condition that the sum $(2n+m)$ totals at least 4.

Each of the chains $-(CH_2)_n-$ and $-(CH_2)_m-$ can in addition carry substitutes; —OH or —SH groups are particularly suitable for this.

From what has been stated above, it will be seen that the mercaptan function —SH can be found in the acid residue and/or in the alcohol residue of the ester; in effect, the ester of formula (1) can result from the esterification of (i) a polyol $HO(CH_2)_mOH$ with 2 moles of acid $HS(CH_2)_nCOOH$ or of (ii) a diacid $HOOC(CH_2)_mCOOH$ with 2 moles of a thio-alcohol $HS(CH_2)_nOH$, wherein each of these alcohols and acids can carry other —OH and/or —SH groups.

As non-limiting examples of compounds in accordance with formula (3) according to the invention, there are the following substances:

| | Ratio SH/C |
|---|---|
| Ethylene glycol bis(mercapto-acetate)<br>$HSCH_2\underset{O}{\overset{\|}{C}}O-CH_2CH_2-O\underset{O}{\overset{\|}{C}}CH_2SH$ | 1/3 |
| Ethylene glycol bis(2-mercapto propionate)<br>$HSCH_2CH_2\underset{O}{\overset{\|}{C}}O-CH_2CH_2-O\underset{O}{\overset{\|}{C}}CH_2CH_2SH$ | 1/4 |
| Glyceryl bis(mercapto-acetate)<br>$HSCH_2\underset{O}{\overset{\|}{C}}O-CH_2\underset{OH}{\overset{\|}{C}}HCH_2-O\underset{O}{\overset{\|}{C}}CH_2SH$ | 1/3.5 |
| Diethylene glycol bis(mercapto-acetate)<br>$HSCH_2\underset{O}{\overset{\|}{C}}O-CH_2CH_2-O-CH_2CH_2-O\underset{O}{\overset{\|}{C}}CH_2SH$ | 1/4 |
| 2,3-Butanediol bis(3-mercapto-butyrate)<br>$HSCH_2CH_2CH_2\underset{O}{\overset{\|}{C}}O-\underset{CH_3}{\overset{\|}{C}}H-\underset{CH_3}{\overset{\|}{C}}H-O\underset{O}{\overset{\|}{C}}CH_2CH_2CH_2SH$ | 1/6 |

-continued

| | Ratio SH/C |
|---|---|
| Pentaerythrityl bis(2-mercapto propionate)<br>$$\text{HSCH}_2\text{CH}_2\overset{\text{O}}{\underset{\|}{\text{C}}}\text{O—CH}_2\text{—}\underset{\underset{\text{CH}_2\text{OH}}{\|}}{\overset{\overset{\text{CH}_2\text{OH}}{\|}}{\text{C}}}\text{—CH}_2\text{O}\overset{\text{O}}{\underset{\|}{\text{C}}}\text{CH}_2\text{CH}_2\text{SH}$$ | 1/5.5 |
| Pentaerythrityl tris(2-mercapto propionate)<br>$$\text{HSCH}_2\text{CH}_2\overset{\text{O}}{\underset{\|}{\text{C}}}\text{O—CH}_2\text{—}\underset{\underset{\underset{\overset{\text{O}}{\|}}{\text{OCCH}_2\text{CH}_2\text{SH}}}{\underset{\text{CH}_2}{\|}}}{\overset{\overset{\text{CH}_2\text{OH}}{\|}}{\text{C}}}\text{—CH}_2\text{—O}\overset{\text{O}}{\underset{\|}{\text{C}}}\text{CH}_2\text{CH}_2\text{SH}$$ | 1/4.66 |
| 2,4-Pentanediol 3-thiol bis(7-mercapto caprylate)<br>$$\text{HS(CH}_2)_7\overset{\text{O}}{\underset{\|}{\text{C}}}\text{O—}\underset{\text{CH}_3}{\overset{\|}{\text{CH}}}\text{—}\underset{\text{SH}}{\overset{\|}{\text{CH}}}\text{—}\underset{\text{CH}_3}{\overset{\|}{\text{CH}}}\text{—O}\overset{\text{O}}{\underset{\|}{\text{C}}}(\text{CH}_2)_7\text{SH}$$ | 1/7 |
| Di(3-mercapto propyl)malonate<br>$$\text{HSCH}_2\text{CH}_2\text{CH}_2\text{—O}\overset{\text{O}}{\underset{\|}{\text{C}}}\text{—CH}_2\text{—}\overset{\text{O}}{\underset{\|}{\text{C}}}\text{O—CH}_2\text{CH}_2\text{CH}_2\text{SH}$$ | 1/4.5 |
| Di(4-mercapto butyl)succinate<br>$$\text{HSCH}_2\text{CH}_2\text{CH}_2\text{CH}_2\text{—O}\overset{\text{O}}{\underset{\|}{\text{C}}}\text{—CH}_2\text{CH}_2\text{—}\overset{\text{O}}{\underset{\|}{\text{C}}}\text{O—CH}_2\text{CH}_2\text{CH}_2\text{CH}_2\text{SH}$$ | 1/6 |
| Di(2-mercapto ethyl)hydroxy-succinate<br>$$\text{HSCH}_2\text{CH}_2\text{—O}\overset{\text{O}}{\underset{\|}{\text{C}}}\text{—}\underset{\text{OH}}{\overset{\|}{\text{CH}}}\text{CH}_2\text{—}\overset{\text{O}}{\underset{\|}{\text{C}}}\text{O—CH}_2\text{CH}_2\text{SH}$$ | 1/4 |
| Di(6-mercapto hexyl)hydroxy-succinate<br>$$\text{HS(CH}_2)_6\text{—O}\overset{\text{O}}{\underset{\|}{\text{C}}}\text{—}\underset{\text{OH}}{\overset{\|}{\text{CH}}}\text{CH}_2\text{—}\overset{\text{O}}{\underset{\|}{\text{C}}}\text{O—(CH}_2)_6\text{SH}$$ | 1/8 |
| Di(7-mercapto heptyl)glutarate<br>$$\text{HS(CH}_2)_7\text{—O}\overset{\text{O}}{\underset{\|}{\text{C}}}\text{—CH}_2\text{CH}_2\text{CH}_2\text{—}\overset{\text{O}}{\underset{\|}{\text{C}}}\text{O—(CH}_2)_7\text{SH}$$ | 1/9.5 |
| Di(2-mercapto ethyl)adipate<br>$$\text{HSCH}_2\text{CH}_2\text{—O}\overset{\text{O}}{\underset{\|}{\text{C}}}\text{—(CH}_2)_4\text{—}\overset{\text{O}}{\underset{\|}{\text{C}}}\text{O—CH}_2\text{CH}_2\text{SH}$$ | 1/5 |
| Di(2-mercapto ethyl)suberate<br>$$\text{HSCH}_2\text{CH}_2\text{—O}\overset{\text{O}}{\underset{\|}{\text{C}}}\text{—(CH}_2)_6\text{—}\overset{\text{O}}{\underset{\|}{\text{C}}}\text{O—CH}_2\text{CH}_2\text{SH}$$ | 1/6 |
| Di(3-mercapto propyl)sebacate<br>$$\text{HSCH}_2\text{CH}_2\text{CH}_2\text{—O}\overset{\text{O}}{\underset{\|}{\text{C}}}\text{—(CH}_2)_8\text{—}\overset{\text{O}}{\underset{\|}{\text{C}}}\text{O—CH}_2\text{CH}_2\text{CH}_2\text{SH}$$ | 1/8 |

The adjunction of the compounds given above, jointly with a stannic stabilizer, enables one to sterilize objects made of polyvinyl chloride with doses of gamma rays exceeding 2 megarads, although one can scarcely exceed 0.5 megarads with 2-mercapto ethyl stearate, known (French patent specification No. 2434835) as an excellent heat stabilizer when it is used jointly with organo-stannic compounds. But, the addition of hydroquinone, according to the present invention, enables one to use doses of radiation of the order of 2.7 megarads instead of 2 megarads in the first case, and about 1 megarad instead of 0.5 megarads in the second of these cases.

The proportions of mercaptan to be added to the polymer, jointly with the hydroquinone, are generally of the same order as those of metallic stabilizers, in particular stannic or antimonious stabilizers. Preferably, these range between 0.1 and 6% by weight, depending upon the nature of the polymer and the nature of the mercaptan or mercaptans which are chosen, as well as in dependence upon the dose of radiation to be used. Within these limits, the protective effect increases with increasing percentage of the mercaptan ester. In practice, the recommended proportion is from 0.5 to 5%, especially from 2 to 4%, of the weight of the polymer. The concentrations of hydroquinone can be less, particularly 0.1 to 3%, and generally 0.2 to 1%.

The incorporation of these adjuvants takes place by kneading at a temperature which is high enough to being about considerable softening of the resin being treated. The invention is illustrated by the following non-limiting examples.

EXAMPLES

Irradiation tests with gamma rays emitted by a cobalt 60 source were carried out on a composition of polyvinyl chloride of the type suitable for the moulding of hollow bodies, especially containers, and for making transparent or opaque films and sheets. In this composition were incorporated various mercaptan esters, prior to irradiation, in order to see how bottles made of this material would behave when sterilized by gamma rays. The resin was a polyvinyl chloride (PVC) with fluidity index $K=57$, with the following added ingredients, according to known techniques.

For 100 parts by weight of PVC the composition contained:
- 0.9 parts of working additive, a polyalkyl acrylate sold under the trade name "PARALOID K 120 N" by the company ROEHM & HAAS;
- 0.7 parts of an anti-caking additive, styrene-alkylacrylate copolymer, known under the trade name "PARALOID K 175" from ROEHM & HAAS;
- parts of shock-resisting strengthener, methacrylate-butadiene-styrene terpolymer, known under the trade name "KANE ACE-B 28 A" (obtainable from the company KANEGAFUCHI of Japan);
- 1.5 parts of heat stabilizer; di-n.octyl di(iso-octyl mercapto-acetate) tin $$(n.C_8H_{17})_2Sn(SCH_2-\underset{\underset{O}{\|}}{C}O-i.C_8H_{17})_2$$

parts of heat co-stabilizer, thio-ethylene glycol bis-β aminocrotonate $$CH_3C=CH-\underset{\underset{O}{\|}}{CS}-CH_2CH_2-\underset{\underset{O}{\|}}{OC}-CH=CCH_3$$
$$\quad\ |\qquad\qquad\qquad\qquad\qquad\qquad\qquad\ |$$
$$\ NH_2\qquad\qquad\qquad\qquad\qquad\qquad\ NH_2$$

obtainable as a commercial product "Irgastab A 70" from the company CIBA-GEIGY;
1.2 parts of lubricant, glyceryl monostearate.

The composition was mixed in a Papenmeier fast blender until the temperature reached 100° C. From the homogeneous mixture thus obtained, a series of 50×40 mm plates were produced with thicknesses of 4 mm, 2 mm and 1 mm respectively, by injection, by means of a Negri-Bossi type V7-8 F. AS machine. In other portions of the same composition, mercaptan esters were incorporated in the Papenmeier blender, and, for each of these esters, a series of plates with the same thickness dimensions as given above were prepared.

The plates were then subjected to gamma radiation from a cobalt 60 source. For each series, the irradiation was given at doses of 0.46, 0.90, and 2.76 megarads.

All the plates having been practically colorless at the start, the coloration was observed after each irradiation treatment.

The following Table summarizes the results of these observations: the intensity of the coloration (yellowish or reddish) is denoted by the symbols − or +:

− indicates that the specimen remained practically colorless;
+ indicates a weak coloration;
++ indicates an average coloration;
+++ indicates a strong coloration;
++++ indicates a very strong coloration.

TABLE I

| Example No | Adjuvants and their % | Radiation dosage in megarads | | |
|---|---|---|---|---|
| | | 0.46 | 0.9 | 2.76 |
| | | Coloration | | |
| 1 | None | ++ | +++ | ++++ |
| 2 | 2-mercapto ethyl stearate 3% | + | ++ | +++ |
| 3 | 2-mercapto ethyl stearate 3% + hydroquinone 0.5% | − | − | ++ |
| 4 | Di(2-mercapto ethyl)adipate 3% | − | − | ++ |
| 5 | Di(2-mercapto ethyl)adipate 3% + hydroquinone 0.5% | − | − | + |
| 6 | Hydroquinone 0.5% | ++ | +++ | ++++ |
| 7 | Hydroquinone 1.0% | + | ++ | +++ |

The comparison of Examples 2 and 3 with Example 1 shows that whereas the mercapto-ethyl stearate effects a slight improvement in the behavior to gamma rays (Example 2), the improvement is remarkable after the addition of the hydroquinone. The di(2-mercapto ethyl-)adipate—Example 4—by itself stabilizes the resin against gamma rays, as indicated in the aforementioned French patent application No. 8021662. However, the adjunction of hydroquinone renders it very much more efficacious, so much so that the yellowing of the resin only begins at 2.76 megarads.

EXAMPLES 8–14

The same operational procedure as described above for the preceding Examples was applied to the same polyvinyl chloride into which was incorporated 1.8% by weight of di-n.octyl di(isooctyl mercaptoacetate) tin, as well as heat stabilizer, but without the addition of the anti-caking substance, the shock-absorbing strengthener, or the working additive. In Examples 8 to 14 the same proportions of the same mercaptans or/and hydroquinone were added as in the respective Examples 2 to 7.

After the gamma ray irradiation it was found that the same results were obtained for the samples 8 to 14 as had been obtained for Examples 1 to 7 respectively.

EXAMPLES 15 TO 25

The tests of Examples 8 to 14, but without any adjuvants other than the stannic compound and the mercaptan or/and hydroquinone, were repeated, but the stannic stabilizer used was dibutyl-tin maleate $$\begin{array}{c}HC-COO\\ \|\qquad\qquad\diagdown\ \diagup Bu\\ \qquad\qquad\qquad Sn\\ \|\qquad\qquad\diagup\ \diagdown Bu\\ HC-COO\end{array}$$

at a proportion of 2% in place of that of the preceding Examples. In Example 15 no other additive at all was added, while in Examples 16 to 25, 2.5 of a mercaptan was introduced, the composition of which was as set out in the following Table II of results, accompanied where indicated by hydroquinone.

TABLE II

| Example No | Added mercaptan ester (2.5%) | Radiation dosage in megarads | | |
|---|---|---|---|---|
| | | 0.46 | 0.90 | 2.76 |
| | | | Coloration | |
| 15 | None | ++ | +++ | ++++ |
| 16 | Ethylene glycol bis-(mercapto-acetate) | − | − | + |
| 17 | Ethylene glycol bis-(mercapto-acetate) + 0.5% hydroquinone | − | − | − |
| 18 | Stearyl mercapto-acetate | + | ++ | +++ |
| 19 | Stearyl mercapto-acetate + 0.2% hydroquinone | − | − | + |
| 20 | Stearyl mercapto-acetate + 0.6% hydroquinone | − | − | − |
| 21 | Butyl α-mercapto caprylate | − | + | ++ |
| 22 | Butyl α-mercapto caprylate + 0.4% hydroquinone | − | − | + |
| 23 | Butyl α-mercapto caprylate + 0.8% hydroquinone | − | − | − |
| 24 | Ethyl α-mercapto-stearate | + | ++ | +++ |
| 25 | Ethyl α-mercapto-stearate + 0.5% hydroquinone | − | − | + |

It will be seen that the tests Nos. 17, 19, 20, 22 and 24, in which hydroquinone accompanied the mercaptan, gave good protection against the effects of the gamma rays. On the contrary, the mercapto-esters Nos 18, 21 and 24, known as good heat stabilizers, gave poor results in the presence of gamma rays when they were used without hydroquinone.

EXAMPLES 26–31

In a series of mixtures of polyvinyl chloride with 1.7% of stannic compound and 2.7% of di(2-mercapto ethyl) adipate, without other adjuvants, the nature of the stannic compound was varied. The compositions obtained were subjected to irradiation, as in the preceding Examples.

The tin stabilizers which were tried were:

| Example | |
|---|---|
| 26 | Dilaurate of dibutyl-tin |
| 27 | Dimethyl di(myristyl mercapto-acetate) tin |
| 28 | Dibutyl di(2-mercapto ethyl stearate) tin |
| 29 | Monobutyl tri (ethyl mercapto-oleate) tin |
| 30 | Monobutyl mercapto-acetate of isooctyl tin sulfide |
| 31 | Compound BuO(SnBu$_2$O)$_2$Bu |

In all these cases, the presence of 0.5% hydroquinone alongside the di(2-mercapto ethyl)adipate improved the behavior with respect to gamma rays to the same degree as in Example 5 (Table I above).

EXAMPLE 32

In Examples 16 and 17, where the added mercaptan ester was ethylene glycol bis(mercapto-acetate), the stannic stabilizer was replaced by the same proportion of n.octyl di(isooctyl mercapto-acetate) antimony.

The colorations after irradiation were similar to those obtained in Examples 16 and 17 respectively.

EXAMPLE 33

Example 25 was repeated, but the antimony heat stabilizer was tri(isooctyl mercapto-acetate) antimony. The improvement in the response to the gamma rays, brought about by the ethylene glycol bis(mercapto-acetate) and hydroquinone, was similar to that of Example 17.

We claim:

1. In a process for the ionization radiation of a vinylic halide polymer at doses sufficient to cause sterilization, the polymer incorporating a composition which is effective for preventing the discoloration produced thereby, the improvement which comprises said composition comprising an organotin or organic antimony containing heat stabilizer, and a mercaptan of the formula

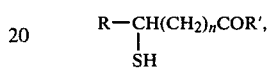

$R(CH_2)_mCOOR''SH$ or $HS(CH_2)_x$—$Z(CH_2)_y$—$Z(CH_2)_xSH$ in which R is hydrogen or $C_{1-20}$ alkyl, R' is $C_{1-18}$ alkyl or alkenyl, R'' is $C_{1-18}$ alkylene or alkenylene, n and m are integers of 0–6, Z is

in which the carbon atom is bound to a chain carbon atom, x is an integer of 1–9, y is an integer of 1–18, the sum (2 x+y) is at least 4, and in which the $(CH_2)_x$ and $(CH_2)_y$ groups are unsubstituted or are —OH or —SH substituted, and hydroquinone.

2. A process as claimed in claim 1, in which the proportion of heat stabilizer is from 0.01 to 5% and by weight of polymer, and the proportion of mercaptan is from 0.1 to 6% and the proportion of hydroquinone is from 0.1 to 3% by weight of the polymer.

3. A process as claimed in claim 2, in which the heat stabilizer is an organo-stannic compound or organo-antimonious compound.

4. A process as claimed in claim 3 in which the heat stabilizer is selected from the group consisting of:

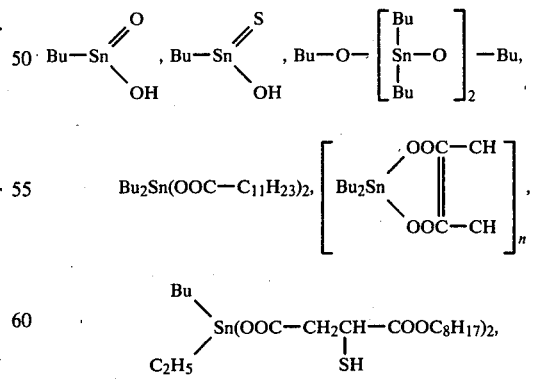

$(C_7H_{15})_2Sn(SC_8H_{17})_2$, $Bu_2Sn(OOC—CH_2SH)_2$, $(C_{10}H_{21})_2Sn(OCH_3)_2$ and $(C_8H_{17})_2Sn(SCH_2—COOC_8H_{17})_2$ wherein "Bu" represents the butyl radical and "n" the degree of polymerization.

5. A process as claimed in claim 3 or 4 in which the mercaptan contains one SH group for each 3 to 10 carbon atoms.

6. A process as claimed in claim 4 in which the mercaptan is of the formula $$HS(CH_2)_x\text{---}Z(CH_2)_y\text{---}Z(CH_2)_xSH.$$

7. A process as claimed in claim 6 in which the vinylic halide polymer is polyvinyl chloride, the proportion of heat stabilizer is from 0.5 to 2.5 percent, the proportion of mercaptan is 0.5 to 5 percent and the proportion of hydroquinone is 0.2 to 1 percent.

8. A process as claimed in claim 7 in which the mercaptan is 2-mercapto ethyl stearate or stearyl mercapto acetate.

9. A process as claimed in claim 6 in which the mercaptan is di(2-mercaptoethyl)adipate.

10. A process as claimed in claim 6 in which the mercaptan is ethylene glycol bis(mercapto acetate).

11. In a sterilized polymer composition comprising a vinylic halide polymer, containing a stabilizing composition which is effective for preventing discoloration produced by the sterilization, the improvement which comprises said stabilizing composition comprising an organotin or organic antimony containing heat stabilizer, a mercaptan of the formula $$R\text{---}\underset{SH}{CH(CH_2)_n}COR',$$

$R(CH_2)_mCOOR''SH$ or $HS(CH_2)_x\text{---}Z(CH_2)_y\text{---}Z(CH_2)_xSH$ in which R is hydrogen or $C_{1-20}$ alkyl, R' is $C_{1-18}$ alkyl or alkenyl, R'' is $C_{1-18}$ alkylene or alkenylene, n and m are integers of 0–6, Z is $$\underset{O}{\overset{\phantom{O}}{-\underset{\|}{C}-O}}$$

in which the carbon atom is bound to a chain carbon atom, x is an integer of 1–9, y is an integer of 1–18, the sum (2x+y) is at least 4, and in which the $(CH_2)_x$ and $(CH_2)_y$ groups are unsubstituted or are —OH or —SH substituted, and hydroquinone.

12. A polymer composition as claimed in claim 11 in which the heat stabilizer is an organostannic compound or organoantimonious compound in a proportion of from 0.1 to 5 percent by weight of polymer, the proportion of mercaptan is from 0.1 to 6 percent and the proportion of hydroquinone is from 0.1 to 3 percent by weight of the polymer.

13. A polymer composition as claimed in claim 12 in which the polymer is polyvinyl chloride, the heat stabilizer is from 0.5 to 2.5 percent, the mercaptan is 0.5 to 5 percent and the hydroquinone is from 0.2 to 1 percent.

14. A polymer composition as claimed in claim 13 in which the mercaptan contains one SH group for each 3 to 10 carbon atoms.

15. A polymer composition as claimed in claim 14 in which the mercaptan is of the formula $$HS(CH_2)_x\text{---}Z(CH_2)_y\text{---}Z(CH_2)_xSH.$$

16. A polymer composition as claimed in claim 15 in which the mercaptan is selected from the group consisting of 2-mercapto ethyl stearate, stearyl mercapto acetate, di(2-mercaptoethyl)adipate and ethylene glycol bis(mercaptoacetate).

* * * * *